April 2, 1946. J. V. COOK 2,397,726
BAKING OVEN
Filed April 14, 1943 7 Sheets-Sheet 1

Fig.1

Inventor:
John V. Cook,
By Bair & Freeman
Attorneys

April 2, 1946.   J. V. COOK   2,397,726
BAKING OVEN
Filed April 14, 1943   7 Sheets-Sheet 4

April 2, 1946.　　　　J. V. COOK　　　　2,397,726
BAKING OVEN
Filed April 14, 1943　　　7 Sheets-Sheet 6

Patented Apr. 2, 1946

2,397,726

UNITED STATES PATENT OFFICE 2,397,726

BAKING OVEN

John V. Cook, Wilmette, Ill., assignor to The Petersen Oven Company, Chicago, Ill., a corporation of Illinois Application April 14, 1943, Serial No. 482,976

9 Claims. (Cl. 107—58)

The present invention relates to commercial types of baking ovens. More particularly this invention is directed to baking ovens of the low-height type, including a horizontally traveling, endless chain conveyer positioned within the baking chamber of the oven to permit loading of the conveyer at one end. The conveyer in such oven structures is such that the food stuff to be baked is caused to travel substantially around the conveyer, in a single course, during which time the baking operation takes place. At the end of the course of travel of the baked food stuff, the pans containing the same may be manually unloaded, but preferably, as herein shown, are discharged on to an unloading conveyer which serves to convey the baked food stuffs exteriorly of the oven. The conveyer as employed in ovens of this type desirably, although not necessarily, includes a multiplicity of spaced apart trays, pivotally mounted at opposite ends on a pair of spaced strands of endless chain.

To insure proper transfer of the baked food stuffs onto the unloading conveyer, the baking conveyer is preferably driven intermittently, and moves in a step-by-step fashion a distance equivalent to the spacing between adjacent trays, so as to cause temporary arresting of the trays during the discharge or transfer operation, and at the same time causing an empty tray to be disposed in registration with the loading opening at the front end of the oven.

It is also preferred that the unloading conveyer be driven in correlation to the baking conveyer so that said unloading conveyer is intermittently driven in correspondence with the baking conveyer, which permits the proper discharge of the baked food stuffs from the baking conveyer onto the unloading conveyer, and enables the separate pans of food stuffs to assume a proper position on the unloading conveyer for movement thereby.

In the use of chain types of baking conveyers, vibration inherent in the movement of the conveyer chain gives great concern to the bakers because of the jiggling and swinging motion imparted to the pivoted trays during movement thereof, and particularly during the movement of the trays from one horizontal run of the conveyer to the other.

Furthermore, this condition is frequently aggravated by improper positioning of the pans of food stuffs on the trays, which results in the pans frequently shifting toward one end or one side of the tray, and often causes the body of food stuff to shift toward one end or one side of the pan, thus resulting in non-uniformity of shape, thickness, and coloring, or "browning" of the baked food stuff.

One of the objects of the invention is to provide a novel safety door construction, located at the front end of the oven, adjacent the loading zone of the operator and wherein the safety door is adapted to be moved to an open position when the pans of baked food stuff are discharged from the baking conveyer and become jammed on the loading conveyer.

Another object is to provide a novel form of dumping mechanism for causing tilting of the pivoted trays on the lower run of the baking conveyer, when the latter is arrested, for conveniently discharging the pans of food stuff on to the unloading conveyer.

A further object is to provide a novel deflector chute constructed and arranged for guiding and directing the pans of food stuff from the trays of the baking conveyer onto the unloading conveyer.

Still another object is to provide a novel and improved baking conveyer construction which results in substantially eliminating all swinging and jiggling motion of the trays during their course of travel around the conveyer, and wherein the trays are restrained in a predetermined upright position of adjustment throughout their entire course of travel around the conveyer.

A still further object resides in the provision of a novel form of stabilizing means in the nature of a three-point suspension for guiding and supporting the pivoted trays in a substantially horizontal upright position throughout their entire course of travel around the conveyer.

And still a further object is to provide novel guide tracks for one end of the baking conveyer for guiding the chains of the conveyer and predetermining the path of travel of the trays with respect to the loading opening at the front end of the oven.

Other objects and advantages of this invention will be apparent from the following description, taken in connection with the accompanying drawings, in which.

In the construction illustrated in the drawings, the baking oven is indicated generally at 10, provided with a longitudinally extending baking chamber 11 surrounded by insulated walls, as is conventional in oven structures of this type. The baking oven herein disclosed is of the low-height type and is provided at one end with a loading opening 12, adapted to be closed by a door 14, which may be understood to be movable in an upwardly direction to full open position, and which, for convenience, may be counterweighted in a conventional manner not shown.

The baking conveyer extends horizontally in the baking chamber 11 and includes a pair of spaced apart strands of endless chain 15 of conventional bar link roller type. These chains, at the far end of the oven chamber, are trained around a pair of transversely spaced apart, axially aligned, driving sprocket wheels 17 mounted on a horizontal shaft 18, one of which, it is to be understood, projects through the side wall of the oven and is connected to suitable driving mechanism not shown.

Figure 12:
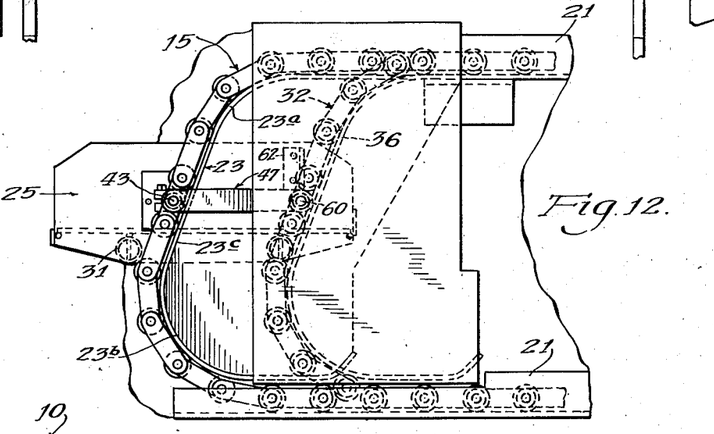
Figure 12 is a fragmentary vertical, longitudinal sectional view through the baking oven, taken as indicated on line 12—12 on Figure 13, showing the loading end of the baking conveyer.
Figure 13:
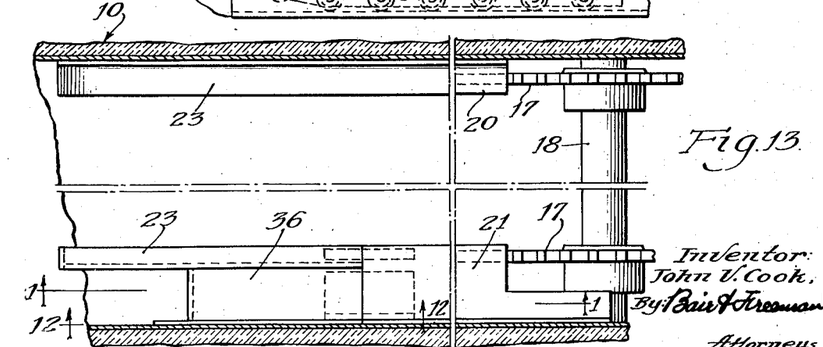
Figure 13 is a transverse horizontal sectional view through the baking chamber, with portions broken away, showing both head and tail ends of the supporting and guiding track arrangements for the chains of the conveyer.

The strands of endless chain provide upper and lower horizontal runs, supported upon two vertically spaced apart sets of angle iron tracks 20 and 21, which merge and register, at the forward or loading end of the baking chamber, with end guide tracks 23 secured to the side walls of the oven. The respective guide tracks connect the upper and lower runs of the respective sets of supporting tracks 20 and 21. Each of the guide tracks 23, as may be seen in Figures 1 and 12 of the drawings, includes a curved section 23a merging with the upper horizontal track and a curved section 23b merging with the lower track. Said section 23b is disposed forwardly with respect to the upper curved section 23a, and the two curved sections are joined together by a straight upwardly inclined section 23c. The purpose of this novel end track design will hereafter be referred to.

The opposite ends of the horizontal tracks 20 and 21 are disposed in proper relation to the sprocket wheels 17 so as to provide a smooth and continuous motion to the conveyer chains in their travel from one horizontal run to the other.

Mounted between the respective strands of chain 15, in longitudinal spaced apart relation thereto, are a multiplicity of supporting trays, indicated generally at 25. These trays as may be seen in Figure 8 of the drawings are of the grille type, and include upright end walls 26 and 27. These trays are pivotally mounted with respect to the strands of chain 15, in an off-center relation so that they tend to normally tilt in a rearward direction, as may be clearly seen in Figures 8 and 9. Suitable means are provided for properly supporting the trays in a predetermined horizontal or upright position throughout their entire path of travel around the conveyer and which permits the trays to be tilted in opposite direction by dumping mechanism, to be hereafter described, for the purpose of discharging the load, comprising pans of food stuffs carried by the trays.

Each of the trays includes in addition to the end walls 26 and 27, a multiplicity of spaced apart rods 29, welded to transversely extending tie rods 30 which in turn are welded on top of tubular members or pipes indicated at 31.

The supporting surface of the tray is thus in the nature of a grille and permits free passage of the heating currents upwardly through the tray and around the pans of the food stuff to be baked for insuring a uniform baking operation during the course of travel of the food stuffs around the baking conveyer.

Figures 8, 9, 10:
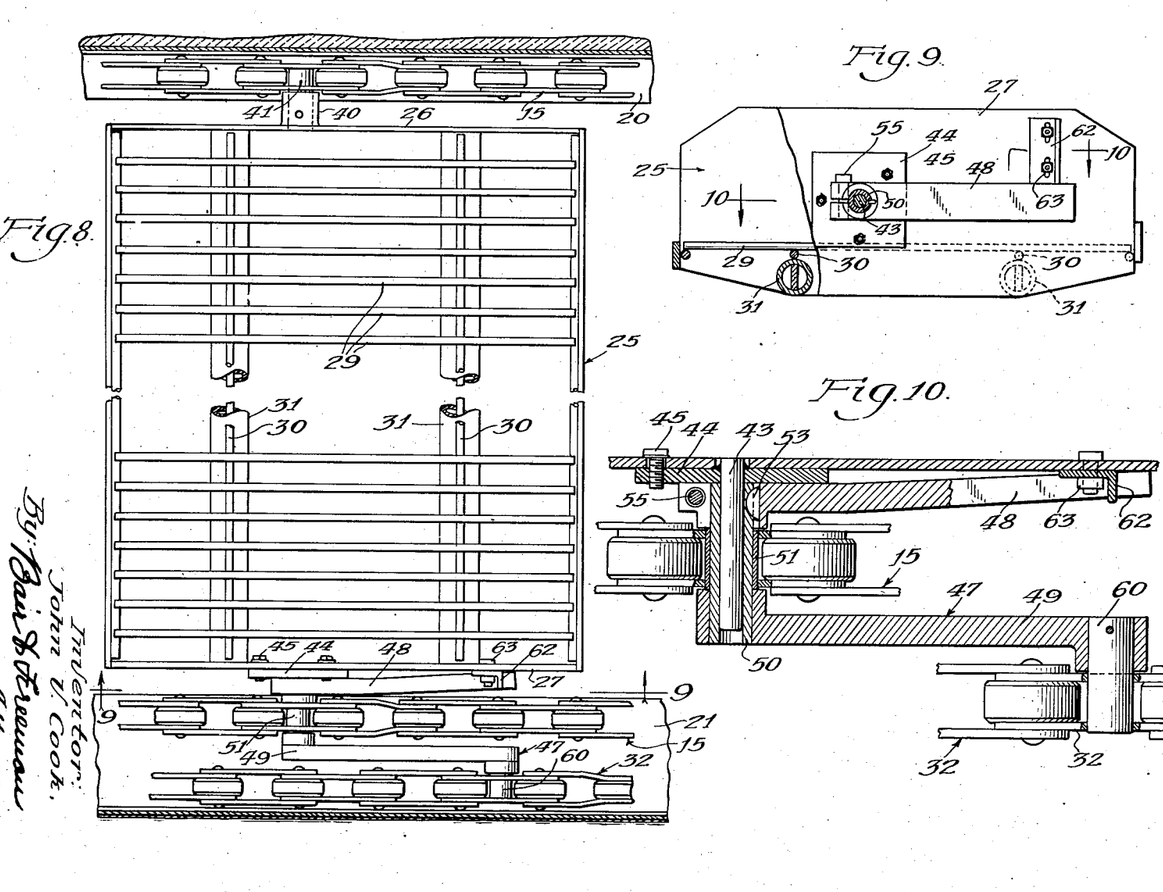
Figure 8 is a fragmentary horizontal sectional view through the baking chamber, showing one of the supporting trays and its connection to the conveyer chains supported on tracks within the oven chamber.
Figure 9 is a view taken as indicated on line 9—9 of Figure 8 showing one of the trays, partly in end elevation and partly in section.
Figure 10 is an enlarged sectional view through one of the trays and the stabilizing means associated therewith, and with the conveyer chain, taken substantially as indicated on line 10—10 of Figure 9.

The means for maintaining the trays 25 in a predetermined upright position of adjustment throughout their entire course of travel around the conveyer includes an endless strand of bar link roller chain indicated at 32, which is disposed adjacent and in parallel relation to one of the strands of the conveyer chain 15, as seen in Figure 8 of the drawings, and is positioned for movement and support on the horizontal tracks 21 as seen in the drawings.

Figure 1:
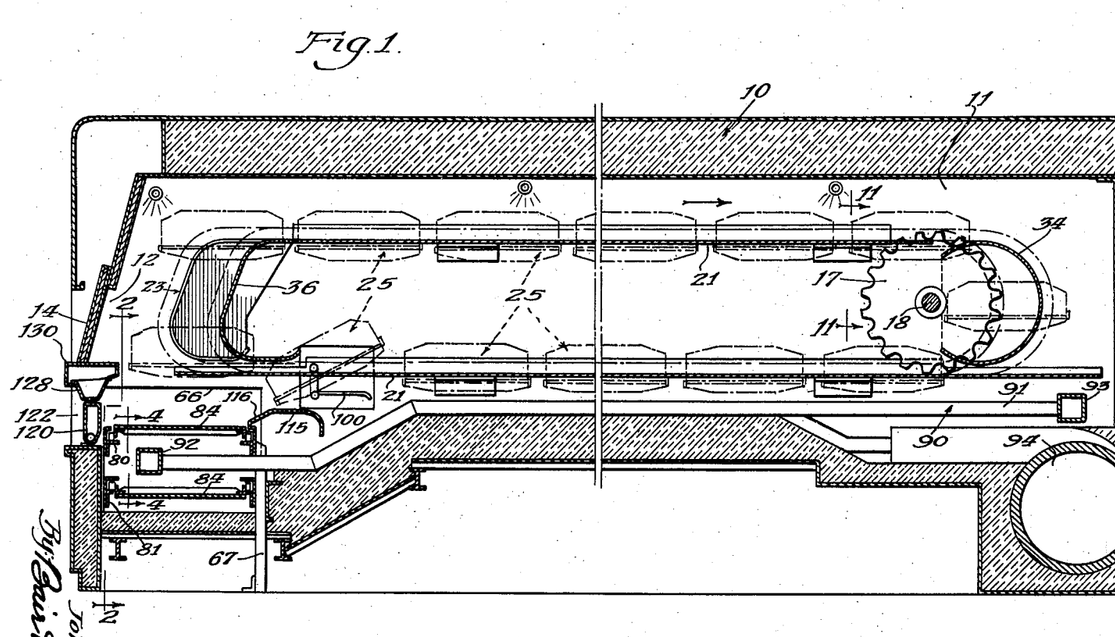
Figure 1 is a longitudinal section through the baking oven embodying the present invention, taken adjacent the near side wall of the oven, substantially as indicated at line 1—1 of Figure 13.
Figure 11:
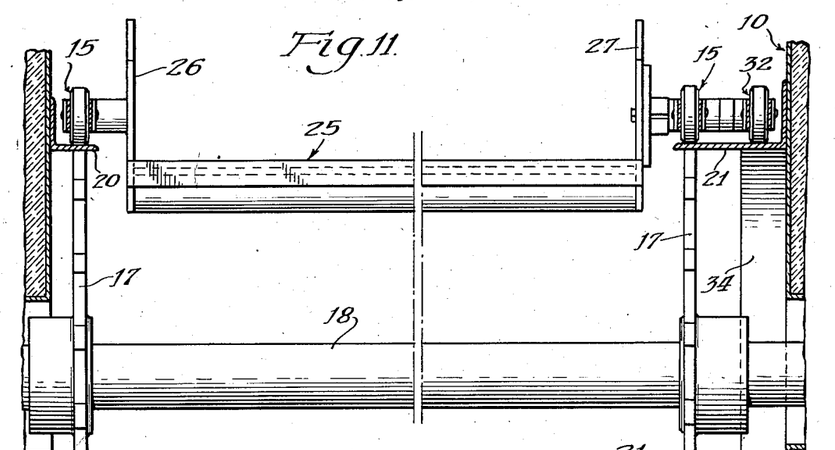
Figure 11 is a vertical sectional view through the head end of the baking conveyer, taken substantially as indicated on line 11—11 of Figure 1.

At the drive end of the conveyer the auxiliary strand of chain 32 is mounted for guided movement around a curved end guide track 34 secured to the same side wall of the oven chamber to which the horizontal tracks 21 are connected, and as seen in Figures 1 and 11. It will be noted that the curved track 34 is offset rearwardly and outwardly with respect to the adjacent sprocket wheel 17. At the opposite or loading end of the conveyer the auxiliary strand of chain 32 is mounted for guided movement around an end guide track 36, connected to the near wall of the oven chamber and which is of similar contour to the guide tracks 23, but spaced forwardly there-from, as may be clearly seen in Figure 1 of the drawings.

The trays 25 are pivotally mounted on trunnions at opposite ends thereof, providing journal support with respect to the strands of chain 15. The end 26 of the tray, opposite the auxiliary strand of chain 32, is provided with a fixed boss 40 to which is rigidly attached a trunnion pin 41, journaled in aligned openings provided in a pair of aligned bar links of the adjacent strand of chain 15, as seen in Figure 8.

At the opposite end of the tray, adjacent the auxiliary strand of chain 32, there is provided a trunnion 43, rigidly attached as by welding to a mounting plate 44, of generally rectangular contour, as seen in Figure 9, and which plate is adapted to be rigidly secured to the outer surface of the end wall 27 of the tray by means of screws 45. The trunnion 43 is adapted to be journaled in a control member indicated generally at 47 which includes spaced apart, rearwardly extending arms 48 and 49, disposed in substantially the same horizontal planes. The arm 49 is rigidly connected, as by welding, to a sleeve 50 journaled on the trunnion 43, said sleeve in turn being journaled in a bushing 51 extending through aligned openings in the side bars of the endless chain 15, as seen in Figure 10 of the drawings.

The arm 48 is rigidly connected to the inner end of the sleeve 50 by means of a key 53, and said arm as clearly seen in Figure 9 of the drawings includes a hub portion surrounding the sleeve and which in turn is bifurcated so as to provide a clamping action around the sleeve by means of a screw 55. This arrangement permits quick and easy assembly or disassembly of the parts so as to facilitate removal and replacement of one of the trays 25 when occasion necessitates. If desired the trunnion 43 and mounting plate 44 may be made a part of each tray or may be removed incident to replacement of a tray.

The outer or rearward end of the arm 49 has rigidly connected thereto a laterally and outwardly extending trunnion or pin 60 which in turn is journaled in a pair of aligned openings in a pair of bar links of the auxiliary strand of chain 32, as seen in Figure 10 of the drawings.

It will now be apparent that because the auxiliary strand of chain 32 is supported on the same horizontal tracks 21 as the adjacent strand of chain 15, and because the arms 48 and 49 in effect become a single unitary structure, they remain in the same relation to the connected strands of chain at all times, except when moving from one of the horizontal runs of the conveyer to the other. The arm 48 serves as a support for the tray 25 which, as above mentioned, is pivotally mounted off-center, on said trunnions 41 and 43, so as to normally tend to tilt in a rearward direction, as may be seen in Figures 8 and 9 of the drawings.

Mounted on the outer surface of the end wall 27 of the tray is a stop member 62, of angular cross-section, positioned to engage the upper surface of the outer end of the arm 48 for supporting the tray in stabilized upright position. The member 62 is vertically adjustable on the end 27 of the tray by slotted openings for the anchoring bolts 63, so as to permit compensating for slight vertical misalignment of the conveyer chains 15, or defects in tray construction, in the initial installation. Such misalignment or defects might result in the strands of chain not traveling in a truly horizontal direction, thus the adjustment permits disposing the load supporting surface of each tray in a true horizontal plane, and maintains it in such relation throughout the entire course of travel around the conveyer. Thus the food stuff in pans supported on the tray do not become distorted in shape or in thickness, which would be objectionable, particularly when the food stuff is in the nature of cakes, pies and the like.

As may be seen in Figure 1 of the drawings, the baking conveyer travels in the direction indicated by the arrow, and because the auxiliary strand of chain 32 is trained around the curved end guide 34 at the driving end of the conveyer, the trunnion 60 of the control member 47 is maintained in proper cooperative horizontally aligned relation to the trunnion 43, so that the tray moves from the upper run to the lower run of the conveyer in a true horizontal position, the same as the position assumed when traveling along either the upper or lower runs of the conveyer. Likewise at the loading of the conveyer the end guide track 36 similarly controls the position of the trunnion 60, as the auxiliary chain passes therearound to maintain the tray in true horizontal plane as it moves from the lower run to the upper run of the conveyer.

Figure 2:
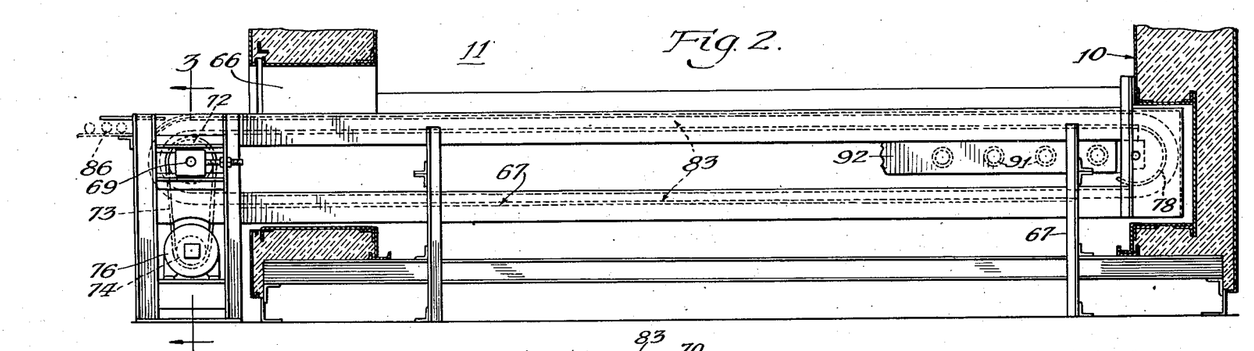
Figure 2 is a vertical transverse sectional view through the forward end of the baking oven, taken on line 2—2 of Figure 1, showing the framing and driving arrangement of the unloading conveyer and its relation to the baking oven proper.
Figure 3:
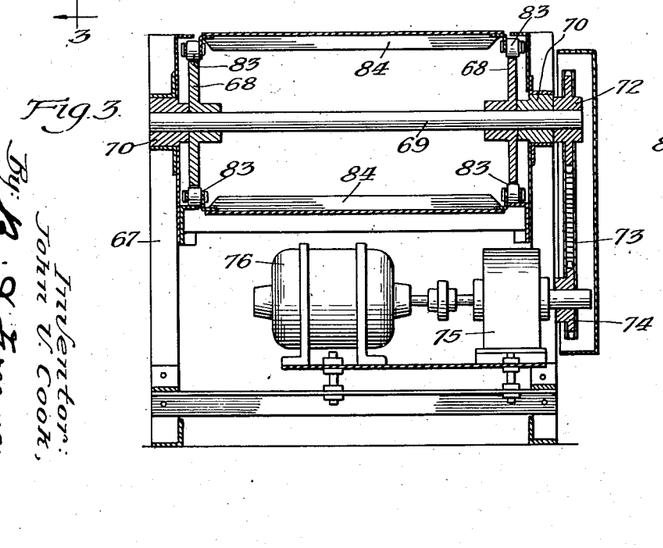
Figure 3 is a vertical transverse section through the driving mechanism of the unloading conveyer, taken substantially as indicated on line 3—3 of Figure 2.
Figure 4:
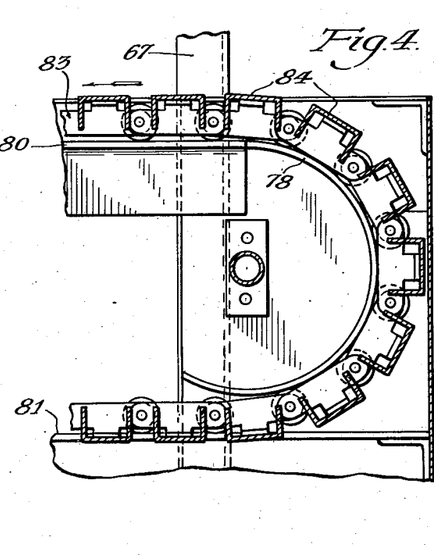
Figure 4 is a fragmentary sectional view through the tail end of the unloading conveyer taken substantially as indicated on line 4—4 of Figure 1.
Figure 5:
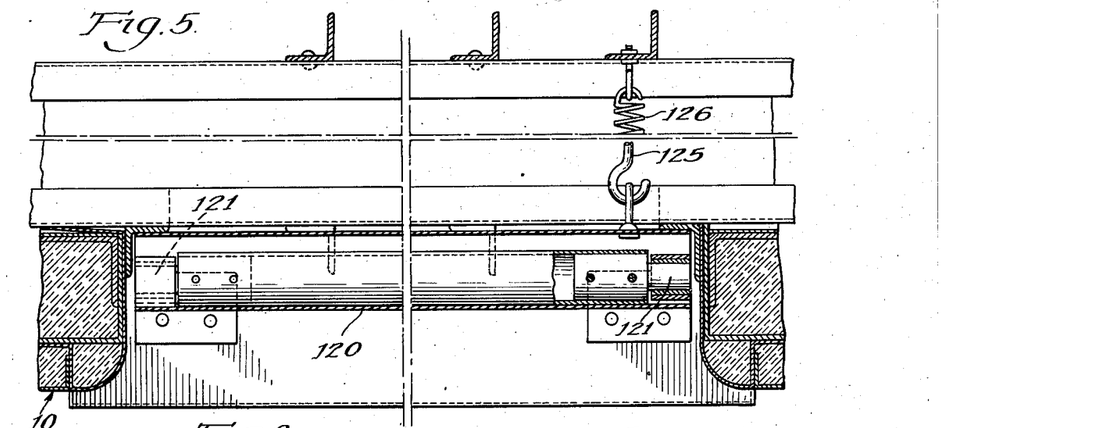
Figure 5 is a transverse sectional view through the novel safety door structure, at the forward end of the oven, taken substantially as indicated at line 5—5 on Figure 6.
Figure 6:
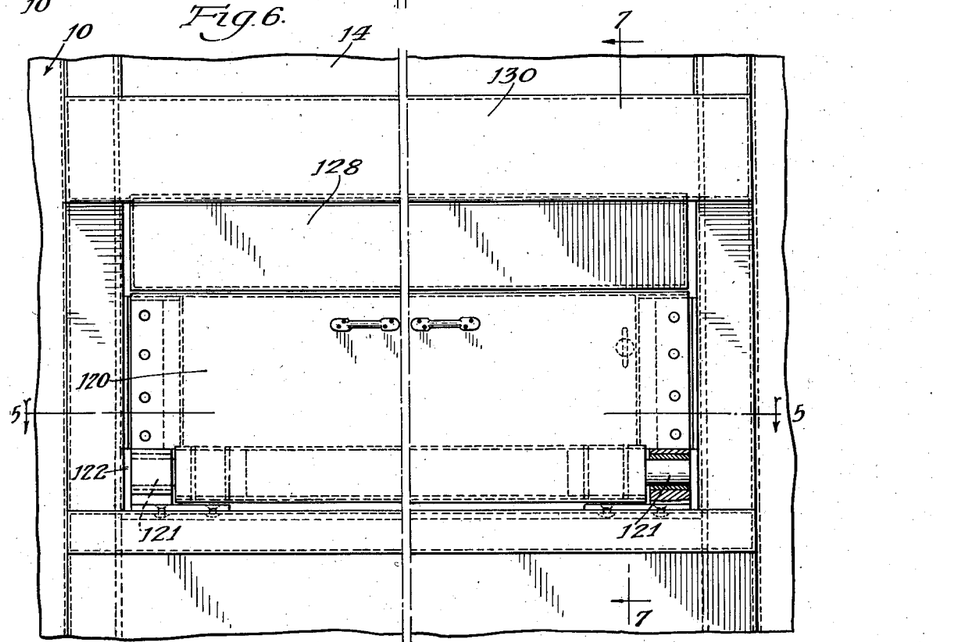
Figure 6 is a fragmentary front elevational view of the oven, showing the safety door construction in elevation.

Disposed below the loading end of the baking conveyer is a transversely extending unloading conveyer of conventional form, one end of which projects through an opening 66 in the side wall of the oven as seen in Figure 2 of the drawings. The unloading conveyer includes suitable angle iron supporting structures indicated generally at 67. The driving end of said unloading conveyer, located outside of the oven, as seen in Figure 2 of the drawings, includes a pair of aligned driving sprocket wheels 68, mounted on a horizontal shaft 69, journaled in bearings 70 carried by the framing structure 67. The outer end of the shaft 69 is provided with a sprocket wheel 72, driven by a chain 73, from a sprocket wheel 74 associated with a speed reducer 75, which in turn is driven by an electric motor 76. The opposite end of the conveyer includes a pair of spaced apart arcuate guide tracks 78 which merge with the ends of angle iron rails or tracks 80 and 81 which serve to support the upper and lower runs of two spaced apart strands of bar link roller chain 83, which are connected together by inverted channel-shaped slats 84 to constitute a substantially continuous web or apron.

The outer or driving end of the unloading conveyer may be connected to any other suitable apparatus for receiving the baked food stuff from the baking oven, and as shown in dotted outline in Figure 2 the unloading conveyer discharges onto a gravity-fed conveyer, a portion of which is indicated in dotted lines at 86.

Mounted in the lower portion of the baking chamber 11 is suitable heat exchange means indicated generally at 90, including a multiplicity of longitudinally extending transversely spaced apart tubes 91, connected at opposite ends to headers 92 and 93. The header 92 is disposed intermediate the upper and lower runs of the unloading conveyer, as clearly seen in Figure 1 of the drawings. By virtue of this arrangement it is possible to maintain a minimum overall height of the baking oven in an oven structure wherein there is also provided a loading conveyer for delivering the baked food stuffs to the exterior of the oven. The heat transfer means may obtain its supply of heat from any suitable source in a conventional manner and may, for convenience, be located in the chamber designated generally at 94, located at the rear end of the oven.

Figure 14:
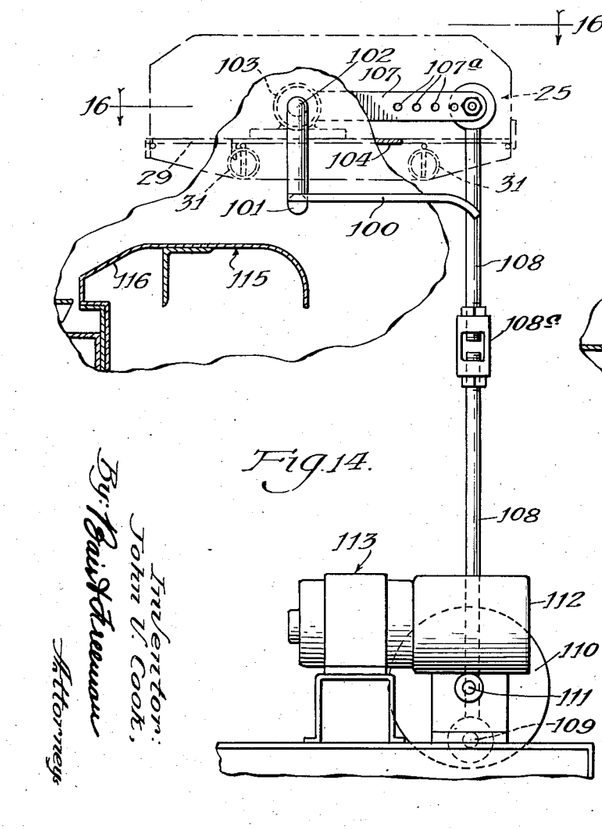
Figure 14 is a staggered view, part in section and part in elevation, showing the novel dumping mechanism and discharge chute, embodying the present invention.

In order to effect transfer of the pans of baked food stuffs from the baking conveyer to the unloading conveyer, suitable dumping mechanism is provided and, as may be noted in Figure 1, the dumping mechanism is located for operation upon the trays on the lower run of the conveyer, adjacent the unloading conveyer. The dumping mechanism includes a tray engaging arm 100 normally disposed immediately below the plane of the bottom of the tray as seen in Figures 1 and 14. Said arm is disposed to one side of the baking chamber in a path adapted to be traversed by the outer end portion of the trays 25 as clearly seen in Figure 16. Said arm 100 is rigidly attached to the end of a horizontally extending portion 101, of a crank-like shaft 102, which is journaled in bearings 103, on platform 104, on the outside of the oven proper. As may be seen in Figure 16, the horizontal portion 101 of the shaft projects through the side wall of the oven into the baking chamber. Rigidly connected to the opposite or outer end of the crank shaft 102 is an arm 107, the outer end of which is pivotally connected to a connecting rod 108, the lower end of which rod is pivotally connected at 109 to a crank wheel 110, which wheel in turn is rigidly connected to a shaft 111, associated with a speed reducer 112, driven by an electric motor 113.

All of the operating mechanism here described is located outside the oven chamber and may be enclosed in a suitable sheet metal housing, not shown. It is to be understood that the operating mechanism for the connecting rod 108 is constructed and arranged so as to move in a single cycle of operation and then become temporarily arrested. During such single cycle of movement, the crank wheel 110 moves from the initial position seen in Figure 14 and when it has traveled 180° from said position, the connecting rod 108 is disposed in the position seen in Figure 15 of the drawings. During the interim of movement from the initial position to the position seen in Figure 15, the tilting arm 100 engages the rearward pipe 31 of the tray 25 and tilts the tray about the axis of its trunnions 41 and 43, and the tray acquires its maximum tilt at such position of adjustment of the rod 108.

It is to be understood that the baking conveyer is intermittently operated as above described, and moves in a step-by-step manner, each step being equivalent to the spacing between adjacent trays. When the baking conveyer is arrested, it is to be understood that one of the trays is arrested in registration with the dumping mechanism, with its trunnion axes substantially in registration with the axis of the upper portion of the crank shaft 102 of the dumping mechanism. When the tray is in its fully tilted position, as indicated in dot and dash outline in Figure 15, it is disposed with its load supporting surface at a sufficiently inclined angle to cause the pans of food stuff normally supported on the rods of the tray, to slide downwardly and forwardly in the direction of the unloading conveyer.

The arm 107 is provided with a radially spaced apart series of openings 107a for providing variations in pivot connections of the upper end of the rod 108, and the rod 108 is provided with a turn-buckle 108a so as to permit obtaining a relatively accurate amount of several ranges of tilting movement for the trays 25.

Figures 15, 16:
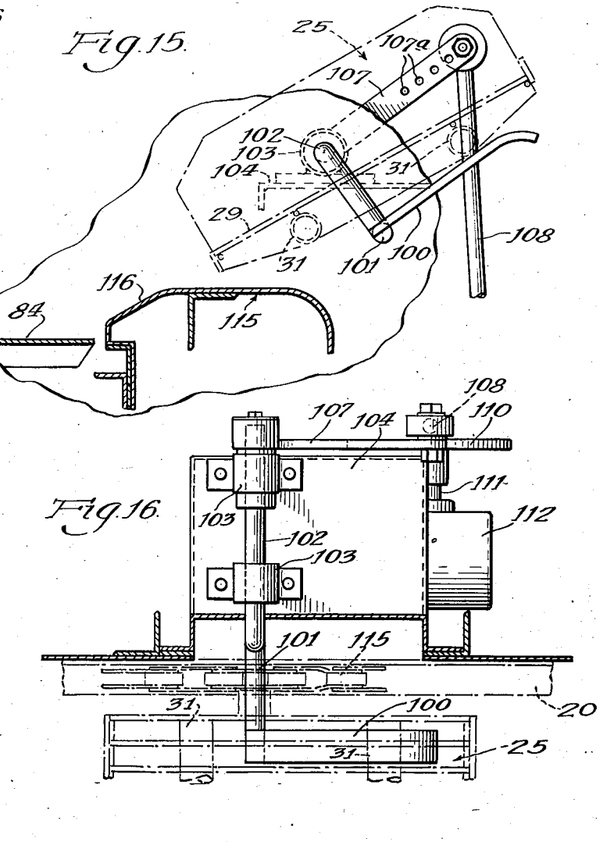
Figure 15 is a fragmentary view of a portion of the dumping mechanism, shown in a position corresponding to the maximum tilted position of a tray, in process of discharging its load.
Figure 16 is a top plan view of the dumping mechanism, taken substantially as indicated on line 16—16 of Figure 14.

To provide support and guidance for the pans of food stuff as they are discharged from the load supporting surfaces of the trays, I provide a deflector chute 115, located immediately adjacent the unloading conveyer and extending at least the entire width of the trays 25. The deflector chute includes an inclined portion 116 disposed in a plane substantially coincident with the plane of the load supporting surface of the tray in its tilted position, as seen in Figure 15 of the drawings. Thus the pans of food stuff as they are discharged from the trays are supported and guided until they are lodged upon the upper run of the unloading conveyer from whence they are conveyed and discharged exteriorly of the oven.

The baking conveyer is preferably intermittently operated in timed relation to the unloading conveyer, so that when the baking conveyer is arrested, the unloading conveyer is likewise arrested, and when the baking conveyer is operating, the unloading conveyer is operating. In this connection it should be understood that the dumping mechanism is also connected by suitable control apparatus with the baking and unloading conveyers so that at the time the baking conveyer and unloading conveyer are arrested, the dumping mechanism functions through a single revolution for effecting tilting of an aligned or registered tray, and during which period the tray is again permitted to assume its normal horizontal load supporting position. When the conveyers are stopped, one of the trays is properly aligned with the loading opening 12, as seen in Figure 1. It is also to be understood that the intermittent starting and stopping of the baking and unloading conveyers may be performed automatically by suitable timing means or may be merely arrested automatically and started manually.

By virtue of the construction described, the operator is free to devote all of his time to loading of the food stuffs onto the baking conveyer, and generally speaking, no thought need be given to the task of unloading, which action is done automatically by the dumping mechanism and the unloading conveyer.

There is a possibility of jamming of the pans of baked food stuffs on the unloading conveyer, such as might occur by backing up of the pans of food stuff thereon by reason of not being permitted to freely discharge at the unloading end. When this occurs, the pans of food stuff may jam immediately below the loading opening 12, and the jamming of the pans might become a serious menace if the conveyers and the dumping mechanism continue to operate, because the pans of food stuff will continue to be discharged from the trays and will tend to move transversely of the unloading conveyer. To assist in overcoming this condition, I provide a safety door 120, hingedly mounted at its lower end at 121 in an opening 122, in the front wall of the oven, below the loading opening 12, in registration with the upper run of the unloading conveyer, as may be clearly seen in Figures 1 and 7 of the drawings.

To insure supporting the safety door 120 in upright position, I provide a connection including connecting rods and turn-buckle as indicated generally at 125, which in turn are connected by a light coil spring 126 to part of the framing structure 67 of the unloading conveyer. In the event of jamming of the trays of food stuffs on the upper run of the unloading conveyer, the pans will tend to abut each other in a transverse direction with respect to the unloading conveyer, and forcibly abut against the safety door 120 which will be caused to swing downwardly to the dotted line position in Figure 7, which will relieve the jamming condition to some extent, and will also direct the attention of the operator to the jammed condition, who then will take immediate steps to alleviate the condition.

Figure 7:
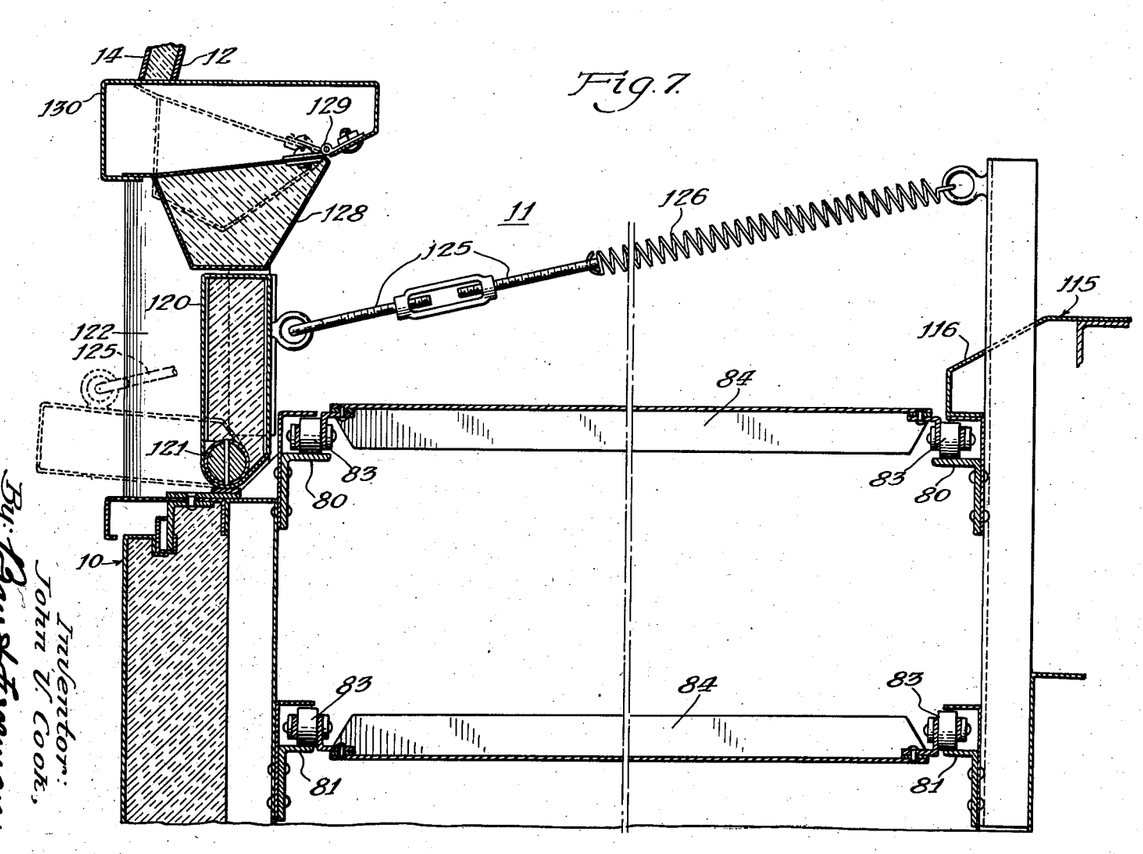
Figure 7 is an enlarged vertical sectional view through the safety door construction at the forward end of the oven, taken substantially as indicated at line 7—7 of Figure 6.

When the safety door is in the dotted line position seen in Figure 1, it is possible that some of the pans might even be moved outwardly upon the upper surface of the door in such position. In the event of the pans, as discharged from the trays, tending to pile one upon the other, I provide an auxiliary safety door 128 located immediately above the door 120, as seen in Figure 7 of the drawings. As may be seen in Figure 7 of the drawings, this auxiliary door is of generally trapezodial shape and is hingedly connected at its upper rear edge as indicated at 129 to a part of the oven front wall, in the form of a sill or shelf structure 130, which defines the bottom of the loading opening 12 in said front wall of the oven.

In the event that the pile-up of the pans of baked food stuff become substantial, the pans may also abut against the auxiliary door 128 and cause it to swing upwardly to the dotted line position seen in Figure 10, which will tend to further relieve the jammed condition and permit some of the pans to be discharged through the opening formed when the doors 120 and 128 are in open position.

Although I have herein shown and described certain preferred embodiments of my invention, manifestly it is capable of modification and rearrangement of parts without departing from the spirit and scope thereof. I do not, therefore, wish to be understood as limiting this invention to the precise forms herein disclosed, except as I may be so limited by the appended claims.

I claim:

1. A baking oven having a baking chamber, an endless, horizontally traveling conveyer in said chamber and including a series of spaced-apart, pivotally mounted trays for supporting pans of food stuff, one end of said conveyer being disposed adjacent a loading opening in the front wall of the oven, an endless unloading conveyer extending transversely of the tray conveyer and disposed below the latter and adjacent the front end of the oven and having one end extending through a side wall of said oven, means for tilting the trays on the lower run of the tray conveyer for discharging the pans of food stuff onto the upper run of the unloading conveyer, a normally closed safety door provided in the front wall of the oven, below said loading opening, and in registration with the upper run of the unloading conveyer, and spring means for yieldingly maintaining said door in closed position, the tension of said spring means being relatively light, whereby said door may be moved to open position against the reaction of said spring means, when forcibly abutted by pans of food stuff jamming on the upper run of the unloading conveyer.

2. A baking oven having a baking chamber, an endless, horizontally traveling conveyer in said chamber and including a series of spaced-apart, pivotally mounted trays for supporting pans of food stuff, one end of said conveyer being disposed adjacent a loading opening in the front wall of the oven, an endless unloading conveyer extending transversely of the tray conveyer and disposed below the latter and adjacent the front end of the oven and having one end extending through a side wall of said oven, means for tilting the trays on the lower run of the tray conveyer for discharging the pans of food stuff onto the upper run of the unloading conveyer, a normally closed safety door provided in the front wall of the oven, below said loading opening, and in registration with the upper run of the unloading conveyer, said safety door being hingedly mounted at its lower end, and light tension spring means for holding said door in upright closed position, whereby forcible abutment of said door by pans of food stuff jamming on the upper run of the unloading conveyer causes said door to move out of upright stabilized position, overcoming the force of said spring means, and assuming an open position.

3. A baking oven having a baking chamber, an endless, horizontally traveling conveyer in said chamber and including a series of spaced-apart, pivotally mounted trays for supporting pans of food stuff, one end of said conveyer being disposed adjacent a loading opening in the front wall of the oven, an endless unloading conveyer extending transversely of the tray conveyer and disposed below the latter and adjacent the front end of the oven and having one end extending through a side wall of said oven, means for tilting the trays on the lower run of the tray conveyer for discharging the pans of food stuff onto the upper run of the unloading conveyer, a normally upright safety door in the front wall of the oven, below said loading opening, in registration with the upper run of the unloading conveyer, said door being hingedly mounted on a horizontal axis at its lower end, spring means normally holding said door in upright closed position, and an auxiliary safety door in the front wall of the oven, hingedly mounted at its upper end and disposed immediately above said upright door, said doors serving to jointly constitute a closure for a single opening in said front wall of the oven.

4. A baking oven having a baking chamber, an endless, horizontally traveling conveyer in said chamber and including a series of spaced-apart, pivotally mounted trays for supporting pans of food stuff, one end of said conveyer being disposed adjacent a loading opening in the front wall of the oven, an endless unloading conveyer extending transversely of the tray conveyer and disposed below the latter and adjacent the front end of the oven and having one end extending through a side wall of said oven, means for tilting the trays on the lower run of the tray conveyer for discharging the pans of food stuff onto the upper run of the unloading conveyer, and heat transfer means located adjacent the bottom of the baking chamber and including a header adjacent each end of said chamber, one of said headers being disposed between the upper and lower runs of the unloading conveyer at the front end of the chamber.

5. In an endless tray conveyer, a pair of aligned, axially spaced-apart driving sprocket wheels, separate, spaced apart strands of endless chain trained around said wheels at one end, guide means for the opposite ends of the chains, track means for supporting the upper and lower runs of the chains, a plurality of material supporting trays pivotally supported at opposite ends on said strands of chain, said pivot connection comprising trunnions on each tray located in transverse alignment with each other at one side of the center of the length of said tray, an auxiliary strand of endless chain disposed parallel and adjacent to one of the aforementioned chains, means for guiding said auxiliary strand of chain for movement in a predetermined path, separate rigid control members for each tray, journaled on the trunnion on the side adjacent the auxiliary strand of chain, each of said members including a pair of arms extending in the same direction toward the farthest edge of the tray, on opposite sides of the adjacent driving strand of chain, the outer arm having its end opposite the trunnion pivotally connected to the auxiliary strand of chain on an axis parallel to the trunnion axis, and means on the adjacent end of the tray, located at the side of the center opposite the pivot axis thereof, adapted to engage the inner arm of said control member for supporting the tray in a substantially horizontal position.

6. In an endless tray conveyer, a pair of aligned, axially spaced apart driving sprocket wheels, separate, spaced apart strands of endless chain trained around said wheels at one end, guide means for the opposite ends of the chains, track means for supporting the upper and lower runs of the chains, a plurality of material supporting trays pivotally supported at opposite ends on said strands of chain, said pivot connection comprising trunnions on each tray located in transverse alignment with each other at one side of the center of the length of said tray, an auxiliary strand of endless chain disposed parallel and adjacent to one of the aforementioned chains, means for guiding said auxiliary strand of chain for movement in a predetermined path, separate rigid control members for each tray, journaled on the trunnion on the side adjacent the auxiliary strand of chain, each of said members including a pair of arms extending in the same direction toward the farthest edge of the tray, on opposite sides of the adjacent driving strand of chain, the outer arm having its end opposite the trunnion pivotally connected to the auxiliary strand of chain on an axis parallel to the trunnion axis, and means on the adjacent end of the tray, located at the side of the center opposite the pivot axis thereof, adapted to engage the upper surface of the inner arm of said control member for supporting the tray in a substantially horizontal position.

7. In an endless tray conveyer, a pair of aligned, axially spaced apart driving sprocket wheels, separate, spaced apart strands of endless chain trained around said wheels at one end, guide means for the opposite ends of the chains, track means for supporting the upper and lower runs of the chains, a plurality of material supporting trays pivotally supported at opposite ends on said strands of chain, said pivot connection comprising trunnions on each tray located in transverse alignment with each other at one side of the center of the length of said tray, an auxiliary strand of endless chain disposed parallel and adjacent to one of the aforementioned chains, means for guiding said auxiliary strand of chain for movement in a predetermined path, separate rigid control members for each tray, journaled on the trunnion on the side adjacent the auxiliary strand of chain, each of said members including a pair of arms extending in the same direction toward the farthest edge of the tray, on opposite sides of the adjacent driving strand of chain, the outer arm having its end opposite the trunnion pivotally connected to the auxiliary strand of chain on an axis parallel to the trunnion axis, and means on the adjacent end of the tray, located at the side of the center opposite the pivot axis thereof, adapted to engage the upper surface of the inner arm of said control member for supporting the tray in a substantially horizontal position, said last mentioned means being adjustable in vertical direction and constituting a stop engageable with said control member to preclude tilting of the tray downwardly at the side opposite the pivot axis thereof.

8. In an endless tray conveyer, a pair of aligned, axially spaced-apart driving sprocket wheels, separate, spaced-apart strands of endless chain trained around said wheels at one end, guide means for the opposite ends of the chains, track means for supporting the upper and lower runs of the chains, a plurality of material supporting trays pivotally supported at opposite ends on said strands of chain, said pivot connection comprising trunnions on each tray located in transverse alignment with each other at one side of the center of the length of said tray, an auxiliary strand of endless chain disposed parallel and adjacent to one of the aforementioned chains, means for guiding said auxiliary strand of chain for movement in a predetermined path, separate rigid control members for each tray, journaled on the trunnion on the side adjacent the auxiliary strand of chain, each of said members including a pair of arms extending in the same direction toward the farthest edge of the tray, on opposite sides of the adjacent driving strand of chain, the outer arm having its end opposite the trunnion pivotally connected to the auxiliary strand of chain on an axis parallel to the trunnion axis, and means on the adjacent end of the tray, located at the side of the center opposite the pivot axis thereof, adapted to engage the inner arm of said control member for supporting the tray in a substantially horizontal position, said arms of each control member being formed as separate elements adapted to be detachably connected together in assembled relation to the chain and cooperating trunnion, in substantially horizontally aligned relation to each other.

9. In an endless horizontally traveling tray conveyer, axially spaced apart driving sprocket wheels at one end, separate spaced-apart strands of endless chain trained around said wheels, fixed guide means for said chains at the opposite end of the conveyer, horizontal tracks for supporting the upper and lower runs of the chains between said wheels and said guide means, and a plurality of spaced apart material supporting trays pivotally supported at opposite ends on said strands of chain, said guide means for each strand of chain comprising a curved downwardly extending section merging with the track for the lower run of the chain, a curved upwardly extending section, located in longitudinally offset relation to the other section, merging with the track for the upper run of the chain, and a straight inclined section joining said two curved sections.

JOHN V. COOK.